United States Patent
Meya et al.

(10) Patent No.: US 8,474,606 B2
(45) Date of Patent: Jul. 2, 2013

(54) LINK CHAIN FOR CHAIN CONVEYORS AND HORIZONTAL CHAIN LINKS THEREFOR

(75) Inventors: Hans Meya, Werne (DE); Gerhard Merten, Lunen (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 243 days.

(21) Appl. No.: 13/055,308

(22) PCT Filed: Jul. 20, 2009

(86) PCT No.: PCT/IB2009/053134
§ 371 (c)(1),
(2), (4) Date: Jan. 21, 2011

(87) PCT Pub. No.: WO2010/010504
PCT Pub. Date: Jan. 28, 2010

(65) Prior Publication Data
US 2011/0127146 A1    Jun. 2, 2011

(30) Foreign Application Priority Data
Jul. 25, 2008    (DE) .................... 20 2008 010 054 U

(51) Int. Cl.
B65G 17/06    (2006.01)
(52) U.S. Cl.
USPC .......................................................... 198/850
(58) Field of Classification Search
USPC ................. 198/717, 725, 728, 730, 731, 733, 198/850; 59/84
See application file for complete search history.

(56) References Cited

U.S. PATENT DOCUMENTS

| | | | | |
|---|---|---|---|---|
| 352,742 A * | 11/1886 | Dodge | ........................... | 198/850 |
| 2,650,470 A | 7/1953 | Sennholtz | | |
| 3,744,239 A * | 7/1973 | I'Anson | ........................... | 59/84 |
| 6,062,374 A * | 5/2000 | Meya | ........................... | 198/731 |
| 7,246,699 B2 * | 7/2007 | Frost et al. | ..................... | 198/851 |
| 7,775,342 B2 * | 8/2010 | Merten et al. | ................. | 198/731 |
| 7,896,766 B2 * | 3/2011 | Mitzschke et al. | ........... | 474/206 |
| 7,997,402 B2 * | 8/2011 | Merten et al. | ................. | 198/728 |
| 2009/0272632 A1 * | 11/2009 | Merten et al. | ................. | 198/835 |
| 2010/0307127 A1 * | 12/2010 | Pengg et al. | ..................... | 59/84 |
| 2011/0272253 A1 * | 11/2011 | Meya et al. | ................... | 198/728 |

FOREIGN PATENT DOCUMENTS

| | | |
|---|---|---|
| DE | 198 06 719 A1 | 10/1998 |
| WO | 98/42999 A1 | 10/1998 |
| WO | 2007/110088 A1 | 10/2007 |

OTHER PUBLICATIONS

International Preliminary Report on Patentability/Written Opinion of International Patent Application No. PCT/IB2009/053134; Jan. 25, 2011.

* cited by examiner

*Primary Examiner* — Leslie A Nicholson, III
(74) *Attorney, Agent, or Firm* — Foley & Lardner LLP

(57) ABSTRACT

A link chain or a chain link for scraper chain conveyors with vertical and horizontal chain links which are interlinked in an articulated manner for scraper chain conveyors for use in mining. In particular to horizontal chain links with front sections with a straight face zone and with longitudinal limbs, which connect the front sections around an oval inner opening and which are provided on their outer surfaces with a recess, wherein the rear sides of front sections delimiting the inner opening form a contact zone for circular arcs of vertical chain links. In order to improve the service life of the link chain, the rear sides, which face oval inner opening, of front sections are provided with a surface which has a hollow, which forms a central region of the contact zone, between a fillet cambered in a crowned manner.

29 Claims, 3 Drawing Sheets

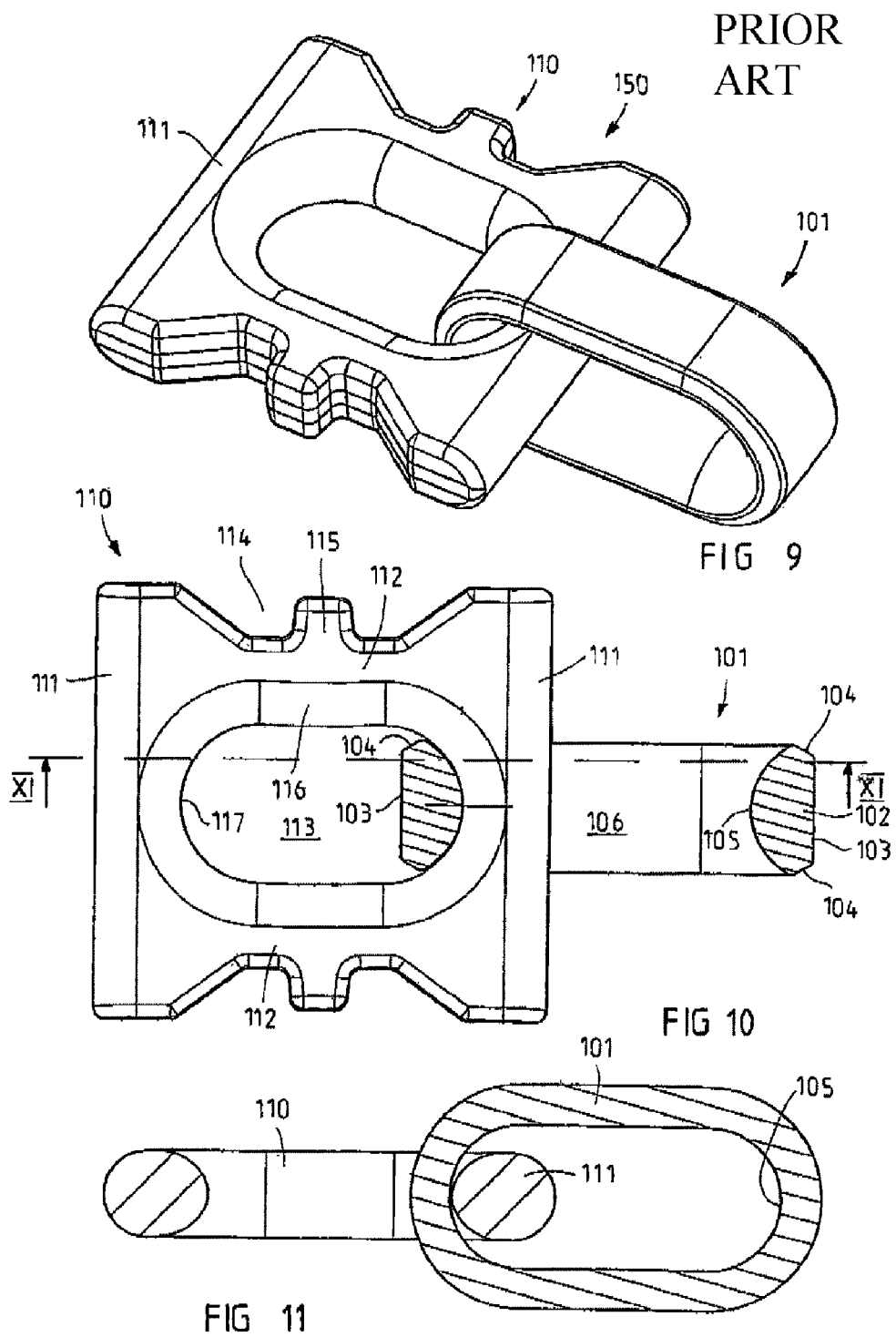

LINK CHAIN FOR CHAIN CONVEYORS AND HORIZONTAL CHAIN LINKS THEREFOR

The invention relates to a link chain for chain conveyors, in particular scraper chain conveyors for use in mining, with vertical chain links which have around the full circumference a constant cross-sectional profile provided on the inside with a circular arc and on the outside preferably with a flat section, and with horizontal chain links which have front sections with a straight face zone and preferably have an outer width which is larger than the outer width of the vertical chain links and have the longitudinal limbs, which connect the front sections around an oval inner opening and which are provided on their outer surfaces with a recess, wherein the rear sides of the front sections delimiting the inner opening form a contact zone for the circular arcs of the vertical chain links and connect the longitudinal limbs with a semi-circular portion. The invention also relates in particular to the horizontal chain links, which preferably act to connect entrainment scrapers, of a link chain for scraper chain conveyors for use in mining, with front sections with a straight face zone and with longitudinal limbs connecting the front sections around an oval inner opening, which longitudinal limbs are provided on their outer surfaces with a recess, wherein the rear sides, which delimit the inner opening, of the front sections form a contact zone for circular arcs of vertical chain links and connect the longitudinal limbs with a semi-circular portion.

BACKGROUND OF THE INVENTION

A generic link chain is known from WO 2007/11088 A1 and FIGS. 9, 10 and 11 show a generic link chain 150, a vertical chain link 101 and a horizontal chain link 110 for connection of an entrainment scraper according to generic WO2007/110088 A1. Vertical chain link 101 has around the full circumference a constant cross-section 102, as shown in FIG. 10, which is delimited on the circumferential outside of chain links 101 by a flat section 103 which forms a transition on both sides via bevels 104 into a circular arc 105 which delimits an inner opening 106, which is oval in cross-section, of vertical chain links 101. Horizontal chain links 110, which comprise forged pieces, have front sections 111 and longitudinal limbs 112 connecting these which in turn delimit with their rear sides or inner sides an oval inner opening 113 in which vertical chain links 101 are interlinked. For optimised scraper connection, longitudinal limbs 112 are provided on the outside with recesses 114 in which entrainment noses 115 are centrally arranged, on which entrainment noses 115 scraper chains can be anchored in a positive-locking manner for conveyance of the mined minerals or rock. Inner opening 113 is delimited by a circumferential fillet 116 with a uniform degree of rounding, which fillet 116 extends on the rear sides of front sections 111 across in each case a semi-circular portion 117. Circular arcs 105 of vertical chain links 101 adjoin this semi-circular portion. FIG. 11 shows in detail the contact of circular arcs 105 and rear sides 107 of front sections 111 in an eccentric section at the edge of vertical chain links 101 and horizontal chain links 110. In the case of the generic link chain, due to the large width of front sections 111 of the horizontal chain links, the linear course of the front side of front sections 111 and the configuration of vertical chain links 101 having a significantly smaller outer width with the approximately semi-circular cross-section, advantageous rotational characteristics of link chain 150 at the driven chain wheel are achieved. As a result of the straight face zones of the front sections, the surface pressures between these and the pockets of the chain wheel are significantly reduced in comparison to otherwise conventional horizontal chain links with arcuate front sections or front faces. Since the front sections of the horizontal chain links protrude relatively far forward and laterally into the respective pockets of the chain links, even after more significant signs of wear on the pockets of the chain wheel, only slightly increased surface pressures over the initial status are generated. Vertical chain links 101 with a semi-circular profile are, at the same time, of a small structure and satisfy the required high cross-sectional strengths in order to be able to withstand even extreme chain forces which occur in operational use of the link chain in high-performance conveyors. Scrapers can be connected and entrained in a positive-locking manner via entrainment means 115 without the need to provide additional reinforcement. Bevel 104 on vertical chain links 101 is intended to additionally improve the angling capacity of the horizontal and vertical chain links relative to one another and the running characteristics of the link chain particularly during feeding into a chain wheel. In the case of generic horizontal chain links 110, the inner surfaces, which face oval inner opening 113, of front sections 111 and of longitudinal limbs 112 have a surface which comprises a circumferential fillet with a uniform radius of curvature, as a result of which the oval inner opening in each case forms a transition via a surface, which is cambered in a crowned manner, to the upper and lower sides of the front sections or longitudinal limbs.

SUMMARY OF THE INVENTION

An object of the invention is to create a high-strength link chain for use in particular in the case of scraper chain conveyors which can even be easily used in the case of large lengths of several hundred meters without being dimensioned overproportionally in terms of their height and in terms of their weight and which is also characterized by good load and running characteristics of the horizontal and vertical chain links between one another and enables a long service life.

According to one aspect of the present invention, provided is a link chain for chain conveyors for use in mining, with vertical chain links which have around the full circumference a constant cross-sectional profile provided on the inside with a circular arc and on the outside with a flat section, and with horizontal chain links which have front sections with a straight face zone and longitudinal limbs, which connect the front sections around an oval inner opening and which are provided on their outer surfaces with a recess, wherein the rear sides of the front sections delimiting the inner opening form a contact zone for the circular arcs of the vertical chain links, the horizontal chain links are provided on the rear sides, which face the oval inner opening, of the front sections with a surface which has a hollow, which forms a central region of the contact zone, within a fillet cambered in a crowned manner.

According to another aspect of the invention, provided is a chain link, preferably for connection of entrainment scrapers to link chains for scraper chain conveyors for use in mining, with front sections with a straight face zone and with longitudinal limbs, which connect the front sections around an oval inner opening and which are provided on their outer surfaces with a recess, wherein the rear sides of the front sections delimiting the inner opening form a contact zone for circular arcs of vertical chain links and connect the longitudinal limbs to a semi-circular portion, the rear sides which face the oval inner opening of the front sections being provided with a surface which has a hollow, which forms a central region of the contact zone, between a fillet cambered in a crowned manner.

According to other aspects of the invention, it is provided that the horizontal chain links are provided on the rear sides, which face the oval inner opening, of the front sections with a surface which has a hollow within a fillet cambered in a crowned manner, which hollow forms a central region of the contact zone. As a result of the fillet cambered in a crowned manner and the hollow, which is formed between two lateral, rounded sections and forms the central region, on the one hand, a substantially more advantageous bearing of the circular arcs of the vertical chain links on the relevant contact surfaces of the rear sides of the front sections is achieved and, at the same time, a greater material thickness can be provided in those regions which lie laterally of the central plane at an offset to the longitudinal limbs of the horizontal chain links. Due to unwinding in ongoing operational use, greater wear occurs on these regions which are proportionally reinforced by the configuration according to the invention than in the central region. The shape of the surface therefore forms an optimised profiling of the rear sides of the front sections and insofar enables in terms of design a longer service life of the chain links and the entire link chain. In particular, the osculation between the circular arcs on the vertical chain links and the contact region on the rear sides of the front sections is significantly improved by the reconfiguration in terms of design with the hollows.

In the case of a link chain with the configuration according to the invention of the horizontal chain links, it is particularly advantageous if the cross-sectional profile of the vertical chain links is provided in each case at the transition of the flat section into the circular arc with a bevel, wherein the cross-sectional profile of the vertical chain links preferably has a width to thickness ratio $L_V/D_V \geq 2$.

In the case of a particularly preferred configuration of a link chain or of a horizontal chain link, the hollow extends with a constant radius of curvature across the surface of the rear sides of the front sections. The constant radius of curvature is therefore preferably adapted to the constant circular arc on the surfaces of the vertical chain links interacting with the contact zone, such that, irrespective of the pivot status of the vertical and horizontal chain links to one another, uniformly optimised surface pressures and contact forces are generated. The design of the surface of the front sections is preferably arrived at such that the radius of curvature of the hollow has a crown line which lies on a central longitudinal plane between the longitudinal limbs of the horizontal chain links. The central longitudinal plane also forms, as is known per se for horizontal chain links, a plane of symmetry in relation to which all horizontal chain links are formed symmetrically. More preferably, the front sections have in the central longitudinal plane a circular cross-section with a defined radius. This radius preferably corresponds to the minimum material thickness of the horizontal chain links which are preferably produced as forged parts. The radius or minimum radius of the horizontal chain links in the symmetrical centre of the front sections is preferably of equal size or substantially of equal size to the radius of curvature of the crowned fillet on those surfaces which lie i.a. adjacent to the hollow. This configuration additionally ensures an improved osculation between the circular arcs on the vertical chain links and the rear sides of the horizontal chain links and minimises the corner stresses which occur to some extent in the prior art.

The crown line of the hollow preferably forms a semicircle around the centre point of the front sections in the central longitudinal plane. The hollow preferably has on the rear side of the front sections a geometric form which is achieved in that the radius of curvature is unwound rotationally symmetrically around the centre point of the front sections. Since the horizontal chain lines are preferably produced as forged parts, only the die must in principle be formed correspondingly negatively for production of the horizontal chain links.

In order to prevent sharp-edged transitions between the hollow formed by means of the unwound radius of curvature and the adjacent crowned fillets, the fillet preferably forms a transition via an intermediate circular portion into the hollow, wherein the radius of curvature of the intermediate circular portion is more preferably significantly smaller, in particular less than half as large as the radius of curvature of the crowned fillet. In the case of forged parts, a suitable radius of curvature of the intermediate circular portion can be approximately 6 mm.

In principle, the surface pressures between the hollow according to the invention and the circular arc at the vertical chain link can also be minimised if the chain links have slightly ovally curved surfaces or circular arcs with changing radii. In the case of the particularly preferred configuration, the hollow has a constant radius of curvature and the circular arc of the vertical chain links also has a constant radius, wherein, more preferably, the radius of curvature of the circular arc of the vertical chain links is preferably 2 to 4 mm smaller than the radius of curvature of the hollow such that in particular the tolerance deviations which unavoidably occur during forging do not adversely affect the improved osculation of the sections of the chain links which are in contact with one another. In the case of horizontal and vertical chain links produced from turned parts, the radius of curvature of the hollow and the radius of the circular arc can also be identical or quasi-identical since, unlike forged parts, production is possible with significantly fewer tolerance deviations.

It is particularly advantageous if the longitudinal limbs are also provided on their inside facing the inner opening with a fillet which is cambered in a crowned manner, wherein the degree of fillet or the fillet radius at the rear side of the front sections and the degree of fillet on the insides of the longitudinal limbs are of equal size.

A link chain according to the invention can comprise a plurality of vertical chain links formed to be identical to one another as well as two different types of horizontal chain links, namely, on the one hand, horizontal chain links, which serve the purpose of scraper connection, and, on the other hand, horizontal chain links which do not have to fulfil this function. Depending on the configuration of the link chain, all or individual horizontal chain links can therefore be provided on both sides in the recesses with entrainment means which are formed centrally between both front sections and in each case protrude in a projecting manner into the relevant recess. In this regard, reference is made to cited WO 2007/110088 A1 in which the preferred configuration of the horizontal chain links with corresponding entrainment means is described in detail. Each entrainment means can comprise an entrainment nose formed on the longitudinal limb with a preferably trapezoidal cross-section and/or the recesses have two linearly bevelled flanks and a base section which is in a straight line up to the projecting entrainment means is formed between the flanks.

It is particularly advantageous if the hollow extends across the entire semi-circular portion into the longitudinal limbs, wherein, as a result of the configuration of the surface, the spread of the hollow reduces parallel to the longitudinal central plane in an approximately straight line towards the outside. A corresponding delimitation of the hollow is generated as a result of the unwinding of the body corresponding to the radius of curvature of the hollow around the centre point as well as the additionally provided fillet.

Further advantages and configurations of a link chain according to the invention will become apparent from the following description of a preferred exemplary embodiment shown in the drawing.

Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 9 shows a perspective view of the chain links of a link chain according to WO2007/110088 from the prior art;

FIG. 10 shows a top view of the chain links from the prior art; and

FIG. 11 shows a sectional view along XI-XI in FIG. 1.

DETAILED DESCRIPTION OF EMBODIMENTS

Figure 8:
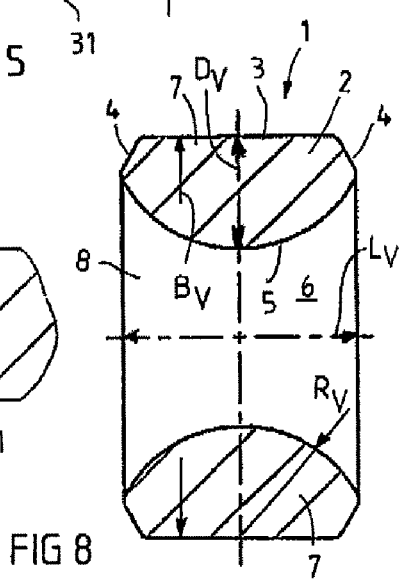
FIG. 8 shows a section through a vertical chain link.

Referring now to the drawings wherein the showings are for the purpose of illustrating preferred and alternative embodiments of the invention only and not for the purpose of limiting same, FIGS. 1 to 4 show, from a link chain 50 according to the invention, a single vertical chain link 1 which is linked into oval inner opening 13 of a horizontal chain link 10. Link chain 50 according to the invention can in particular be used in the case of scraper chain conveyors which are used as face conveyors in underground mining use, and in the case of which horizontal chain links 10 stand horizontally and rotate with link chain 50 in this horizontal alignment, while vertical chain links 1 rotate correspondingly perpendicular to this, therefore standing vertically. Vertical chain links 1 have longitudinal limbs 7 and chain fronts 8 which are provided around the full circumference with a constant cross-section 2, as is in particular apparent from FIG. 8 to which reference will now be briefly made first. Circumferentially constant cross-section 2 is delimited on the outside of longitudinal limbs 7 and chain fronts 8 by a flat section 3 and, towards oval inner opening 6, longitudinal limbs 7 and chain fronts 8 each have a circular arc 5 which preferably across its entire extension has a radius $R_V$ which is approximately 35 mm in the case of the preferred chain link thickness of a 42 mm chain. Circular arc 5 forms a transition into flat section 3 in each case via a bevel 4 running at an angle of approximately 60°±2° at an incline to flat section 3. Cross-sectional profile 2 of the vertical chain links has a width $L_V$, height $B_V$ and a thickness $D_V$ which in the case of a 42 mm chain are approximately $L_V$=62 mm, $B_V$=102 mm and $D_V$=30 mm. Inner opening 6 then has a clear opening width of approximately 48 mm and a clear opening or dividing length of approximately 140 mm.

Figure 1:
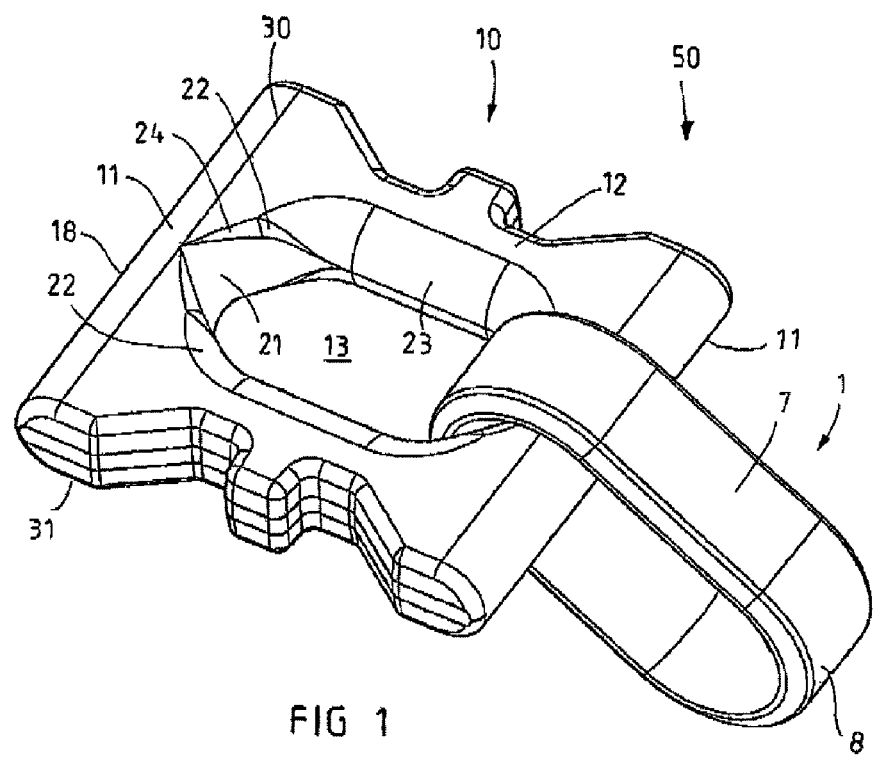
FIG. 1 shows a perspective view of a horizontal and a vertical chain link of a link chain, not shown in further detail, according to the invention.
Figure 2:
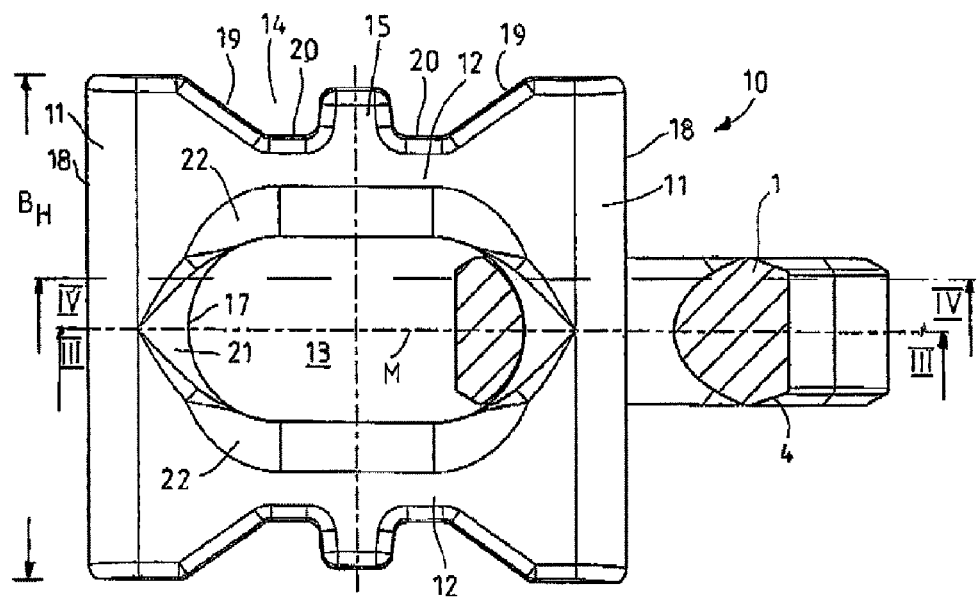
FIG. 2 shows a top view of the link chain from FIG. 1.

Horizontal chain links 10 comprise one-part or one-piece forged links with two front sections 11 with a straight face zone 18 aligned at a right angle to the running direction of link chain 50, wherein both front sections 11 are connected at the rear side via longitudinal limbs 12, as is clearly apparent from FIGS. 1 and 2. Horizontal chain links 10 have two front sections 11 formed to be identical to one another as well as longitudinal limbs 12 formed to be identical to one another, only the cross-sectional profile changes approximately constantly within front sections 11 and longitudinal limbs 12. Horizontal chain links 10 have an approximately rectangular basic shape and face zone 18 running straight in the chain link central plane and perpendicular to the running direction extends approximately across entire outer width $B_H$ of horizontal chain links 10. Outer width $B_H$ is larger than outer width $B_V$ of vertical chain links 1 (cf. FIG. 8). The ratio can be preferably approximately $B_H/B_V$=210/102, therefore approximately 2:1. Both longitudinal limbs 12 have on the outside a recess 14 in which, centrally between both front sections 11, an entrainment nose 15 is formed as a positive-locking entrainment means for entrainment scrapers, not shown, onto which the entrainment scrapers are placed e.g. from above and can then be locked. As is easily apparent from FIG. 2, entrainment nose 15 has an approximately trapezoidal cross-section and each recess has two linearly bevelled flanks 19, which form a transition into linear base sections 20, relative to which entrainment noses 15 project within recess 14. The length of recess 14 is slightly larger than the clear opening or dividing length (approx. 140 mm) of inner opening 13 in the region of opposing semi-circular portions 17 in longitudinal central plane M which halves front sections 11 and in which face zones 18 run straight at the front side of front sections 11. All transition surfaces are bevelled with approximately 6° in order to produce chain links 10 according to the invention as forged pieces.

Figure 5:
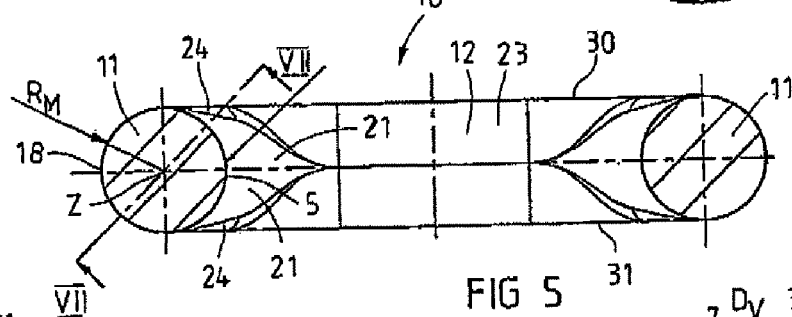
FIG. 5 shows a longitudinal section along a central plane of the horizontal chain link according to the invention.

Horizontal chain links 10 of link chain 50 are optimised for interaction with vertical chain links 1 in particular on the rear sides of front sections 11 facing inner opening 13 and this optimisation will now be explained in detail with reference to the further figures. The innovation according to the invention relates in particular to the configuration of the surfaces of the rear side of front sections 11 and the insides of longitudinal limbs 12 towards inner opening 13 delimited by these. As is already clearly apparent from FIGS. 1 and 2, the rear sides of front sections 11 are provided, directly adjacent to semi-circular portion 17 with which front sections 11 delimit oval inner opening 13 centrally of the chain links or in the horizontal central plane, with a hollow 21 which extends here tapering in a pointed manner or in a V-shape up to upper side 30 and lower side 31 of horizontal chain links 10. Hollow 21 has the largest spread in the region of the horizontal central plane of the chain links and the spread correspondingly reduces towards upper side 30 and towards lower side 31. Hollow therefore extends in a uniform manner from semi-circular portion 17 to upper side 30 or from semi-circular portion 17 to lower side 31 of the horizontal chain links and forms the central region of the contact zone which the circular arcs (5) of vertical chain links 1 linked into horizontal chain links 10 adjoin. FIG. 5 shows a vertical section through a horizontal chain link 10 in the region of (vertical) central longitudinal plane M. Front sections 11 have in central longitudinal plane M a circular cross-section with a radius $R_M$ which forms the minimum material thickness of the horizontal chain links and in the case of the particularly preferred configuration of a 42 mm chain is approximately $R_M$=21 mm.

Figure 7:
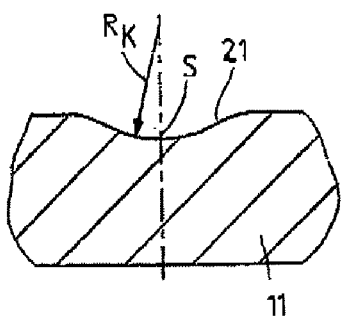
FIG. 7 shows a sectional view along VII-VII in FIG. 5.

Entire face zone 18 of front sections 11, which runs straight at the front side, is preferably rounded with the same radius $R_M$ so that therefore a face zone 18 which is rounded uniformly between upper side 30 and lower side 31 extends across the entire front surface of horizontal chain links 10. Hollow 21 in the surface of the rear side of front sections 11 preferably has a constant radius of curvature $R_K$, as is schematically indicated in FIG. 7, wherein this radius of curvature $R_K$, depending on the manufacturing precision, corresponds either to the rounding diameter of circular side 5 of vertical chain links 1 or, particularly in the case of forged parts, is larger by a necessary oversize of approximately 2 to 4 mm, preferably 3 mm. Hollow 21 is produced by unwinding this radius of curvature $R_K$ around centre point Z of front sections 11 in longitudinal central plane M, as a result of which the V-shaped taper of hollow 21 is inevitably produced towards upper side 30 and lower side 31 of horizontal chain links 10. Crown line S of hollow 21 coincides with the surface of front sections 11 in longitudinal central plane M and it extends on a semi-circle around centre point Z of front sections 11 in central longitudinal plane M.

Figure 6:
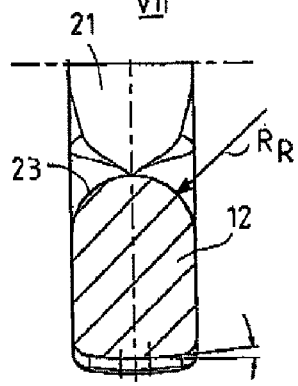
FIG. 6 shows a section through a longitudinal limb of a horizontal chain link according to the invention.

Reference is now made again to FIGS. 1 and 2 from which it is clearly apparent that longitudinal limbs 12 are provided on insides 23 with a crowned fillet, wherein the degree of rounding of this fillet of longitudinal sides 23 is preferably of equal size to radius $R_M$ or the rounding diameter at face zones 18 of front sections 11. This fillet of longitudinal sides 23 extends partially into the rear sides of front sections 11, as indicated with partial surface 22 of the surface of the rear sides at the transition to longitudinal sides 23 respectively in FIGS. 1 and 2. The rear side of front sections 11 therefore has a radius of curvature $R_K$ which is rounded with fillet radius $R_M$. In order to prevent a sharp-edged transition between this degree of fillet with diameter $R_M$ and hollow 21 with radius of curvature $R_K$, the transition surfaces are rounded with an intermediate rounding 24 which is preferably approximately 6°. FIGS. 1, 5 and 6 clearly show that hollow 21 and intermediate rounding 24 each extend across the rear side of front sections 11 up to the insides of longitudinal limbs 12 and also taper in a pointed manner or in a V-shape there before the fillet only extends with degree of rounding $R_R$ across the inside 23 of longitudinal limbs 12. Degree of fillet $R_R$ of longitudinal sides 23 is indicated on longitudinal limbs 12 in FIG. 6 and is preferably of equal size to degree of fillet $R_M$ on the front sections.

Figure 3:
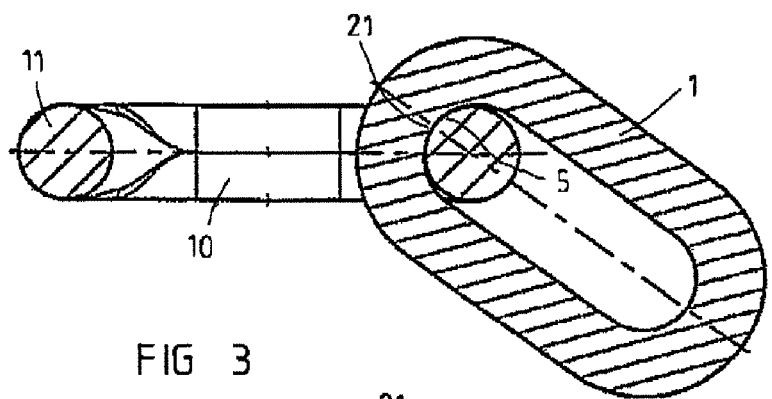
FIG. 3 shows a sectional view along in FIG. 2.
Figure 4:
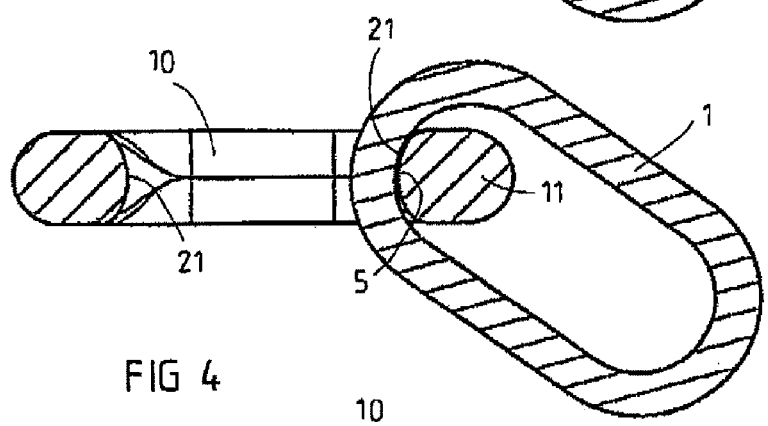
FIG. 4 shows a sectional view along IV-IV in FIG. 2.

Hollow 21 provided according to the invention centrally of the rear sides of front sections 11, with which hollow 21 the central region of the contact zone of horizontal chain links 10 with circular arcs 5 of vertical chain links 1 is formed, leads, in particular eccentrically to central longitudinal place M, to a significantly improved osculation of the contact surfaces of vertical chain links 1 and horizontal chain links 10 relative to one another, as is particularly clearly apparent from FIGS. 3 and 4. Herein, FIG. 3 shows the osculation of the contact surfaces, i.e. of circular cross-section $R_M$ in the centre or central longitudinal plane M of front sections 11 with the crown camber of circular arc 5. FIG. 4 shows the contact surfaces at a lateral offset to the central longitudinal plane at the outer edge of the inner opening of vertical chain links 1 and it is clearly apparent that the surfaces here also uniformly adjoin one another in the form of hollow 21 of horizontal chain link 10 and of circular arc 5 of vertical chain link 1. The improved osculation is particularly clear in the case of a comparison of FIG. 4 and FIG. 11 which shows the same status in the case of the generic chain links from the prior art according to WO2007/110088 A1. Particularly in the edge region, only a small degree of bearing of the contact surfaces was achieved there, as a result of which increased wear could occur due to line pressure on the camber crown of the vertical chain links and the surfaces of the horizontal chain links. As a result of the measures according to the invention, the corresponding edge regions of front sections 11 have a greater material thickness on the rear side, as a result of which the service life of horizontal chain links 10 is also significantly improved.

Numerous modifications which should fall within the scope of protection of the attached claims are apparent to the person skilled in the art from the above description. The indicated dimensions correspond to a chain link with a chain link strength of 42 mm and a modular width of approximately 140 mm. In the case of chain links with a larger or smaller chain link strength and a correspondingly changed modular width, other diameters and radii of curvature can thus be produced in order to achieve the same optimisation of the horizontal chain links and the interaction of horizontal and vertical chain links. Since not every horizontal chain link must be used to connect an entrainment scraper in a link chain, individual horizontal chain links can be provided with corresponding entrainment means and the other chain links do not have any corresponding entrainment nose. In the case of these horizontal change links which then only form connecting links, the recess could also have a different geometric dimension.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A link chain for chain conveyors, in particular scraper chain conveyors for use in mining, comprising:
   vertical chain links which have around the full circumference a constant cross-sectional profile provided on the inside with a circular arc and on the outside with a flat section;
   horizontal chain links which have front sections with a straight face zone and longitudinal limbs, which connect the front sections around an oval inner opening and which are provided on their outer surfaces with a recess;
   wherein the rear sides of the front sections delimiting the inner opening form a contact zone for the circular arcs of the vertical chain links, the horizontal chain links are provided on the rear sides, which face the oval inner opening, of the front sections with a surface which has a hollow, which forms a central region of the contact zone, within a fillet cambered in a crowned manner; and
   wherein the vertical chain links are provided at the transition of the flat section to the circular arc with a bevel, wherein the cross-sectional profile of the vertical chain links preferably has a width to thickness ratio $L_v/D_v > 2$.

2. A link chain according to claim 1, wherein the hollow extends with a constant radius of curvature across the surface of the rear sides of the front sections.

3. A link chain according to claim 2, wherein the radius of curvature of the hollow has a crown line which lies on a central longitudinal plane between the longitudinal limbs of the horizontal chain links.

4. A link chain according to claim 3, wherein the front sections have in the central longitudinal plane a circular cross-section with a radius which is preferably of equal size or substantially of equal size to the radius of curvature of the crowned fillet.

5. A link chain according to claim 3, wherein the crown line of the hollow forms a semicircle around the centre point of the front sections in the central longitudinal plane.

6. A link chain according to claim 3, wherein the hollow on the rear side of the front sections comprises a rotationally symmetrical unwinding of the radius of curvature around the centre point of the front sections.

7. A link chain according to claim 3, wherein the fillet forms a transition via an intermediate circular portion into the hollow, wherein the radius of curvature of the intermediate circular portion is preferably less than half as large as the radius of curvature of the crowned fillet.

8. A link chain according to claim 3, wherein the hollow has a constant radius of curvature and the circular arc of the vertical chain links also has a constant radius which is preferably approximately 1 to 4 mm smaller than the radius of curvature of the hollow.

9. A link chain according to claim 3, wherein the hollow extends across an entire semi-circular portion into the longitudinal limbs.

10. A link chain according to claim 1, wherein the longitudinal limbs on the insides facing the inner opening are provided with a fillet which is cambered in a crowned manner, whose radius of curvature is preferably of equal size to the radius of curvature on the rear sides of the front sections.

11. A link chain, comprising:
vertical chain links which have around the full circumference a constant cross-sectional profile provided on the inside with a circular arc and on the outside with a flat section;
horizontal chain links which have front sections with a straight face zone and longitudinal limbs, which connect the front sections around an oval inner opening and which are provided on their outer surfaces with a recess;
wherein the rear sides of the front sections delimiting the inner opening form a contact zone for the circular arcs of the vertical chain links, the horizontal chain links are provided on the rear sides, which face the oval inner opening, of the front sections with a surface which has a hollow, which forms a central region of the contact zone, within a fillet cambered in a crowned manner; and
wherein at least one horizontal chain link is provided on both sides in the recesses with an entrainment nose formed centrally between both front sections, each entrainment nose protruding in a projecting manner into the relevant recess.

12. A link chain according to claim 11, wherein each entrainment nose is formed on the longitudinal limb with a preferably trapezoidal cross-section.

13. A link chain according to claim 12, wherein the recesses have two linearly beveled flanks and a base section which is in a straight line up to the projecting entrainment nose, which is formed between the flanks.

14. A chain link, preferably for connection of entrainment scrapers to link chains for scraper chain conveyors for use in mining, comprising:
front sections with a straight face zone and with longitudinal limbs, which connect the front sections around an oval inner opening and which are provided on their outer surfaces with a recess,
wherein the rear sides of the front sections delimiting the inner opening form a contact zone for circular arcs of vertical chain links and connect the longitudinal limbs to a semi-circular portion, the rear sides which face the oval inner opening of the front sections being provided with a surface which has a hollow, which forms a central region of the contact zone, between a fillet cambered in a crowned manner; and
wherein the chain link is provided on both sides in the recesses with an entrainment nose formed centrally between both front sections protrudes into the relevant recess.

15. A chain link according to claim 14, wherein the hollow extends with a constant radius of curvature across the surface of the rear sides of the front sections.

16. A chain link according to claim 15, wherein the radius of curvature of the hollow has a crown line which lies on a central longitudinal plane between the longitudinal limbs of the horizontal chain links.

17. A chain link according to claim 16, wherein the front sections have in the central longitudinal plane a circular cross-section with a radius which is preferably of equal size or substantially of equal size to the radius of curvature of the crowned fillet.

18. A chain link according to claim 16, wherein the crown line of the hollow forms a semicircle around the centre point of the front sections in the central longitudinal plane.

19. A chain link according to claim 16, wherein the hollow on the rear side of the front sections comprises a rotationally symmetrical unwinding of the radius of curvature around the centre point of the front sections.

20. A chain link according to claim 16, wherein the fillet forms a transition via an intermediate circular portion into the hollow, wherein the radius of curvature of the intermediate circular portion is preferably less than half as large as the radius of curvature of the crowned fillet.

21. A chain link according to claim 16, wherein the hollow has a constant radius of curvature and the circular arc of the vertical chain links also has a constant radius which is preferably approximately 1 to 4 mm smaller than the radius of curvature of the hollow.

22. A chain link according to claim 16, wherein the hollow extends across an entire semi-circular portion into the longitudinal limbs.

23. A chain link according to claim 14, wherein the longitudinal limbs on the insides facing the inner opening are provided with a fillet which is cambered in a crowned manner, whose radius of curvature is preferably of equal size to the radius of curvature on the rear sides of the front sections.

24. A chain link according to claim 14, wherein each entrainment nose is formed on the longitudinal limb with a preferably trapezoidal cross-section.

25. A chain link according to claim 24, wherein the recesses have two linearly beveled flanks and a base section which is in a straight line up to the projecting entrainment nose, which is formed between the flanks.

26. A link chain for chain conveyors, comprising:
vertical chain links which have around the full circumference a constant cross-sectional profile provided on the inside with a circular arc and on the outside with a flat section;
horizontal chain links which have front sections with a straight face zone and longitudinal limbs, which connect the front sections around an oval inner opening and which are provided on their outer surfaces with a recess;
wherein the rear sides of the front sections delimiting the inner opening form a contact zone for the circular arcs of the vertical chain links, the horizontal chain links are provided on the rear sides, which face the oval inner opening, of the front sections with a surface which has a hollow, which forms a central region of the contact zone, within a fillet cambered in a crowned manner;

wherein the hollow extends with a constant radius of curvature across the surface of the rear sides of the front sections and the radius of curvature of the hollow has a crown line which lies on a central longitudinal plane between the longitudinal limbs of the horizontal chain links and the hollow on the rear side of the front sections comprises a rotationally symmetrical unwinding of the radius of curvature around the centre point of the front sections.

27. A link chain according to claim 26, wherein the fillet forms a transition via an intermediate circular portion into the hollow, wherein the radius of curvature of the intermediate circular portion is preferably less than half as large as the radius of curvature of the crowned fillet.

28. A link chain according to claim 26, wherein the hollow has a constant radius of curvature and the circular arc of the vertical chain links also has a constant radius which is preferably approximately 1 to 4 mm smaller than the radius of curvature of the hollow.

29. A link chain according claim 26, wherein the hollow extends across an entire semi-circular portion into the longitudinal limbs.

* * * * *